(12) United States Patent
Steinberg

(10) Patent No.: US 8,832,556 B2
(45) Date of Patent: Sep. 9, 2014

(54) SYSTEMS AND METHODS FOR IMPLEMENTATION OF A STRUCTURED QUERY LANGUAGE INTERFACE IN A DISTRIBUTED DATABASE ENVIRONMENT

(75) Inventor: Arieh Steinberg, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 1262 days.

(21) Appl. No.: 12/072,003

(22) Filed: Feb. 21, 2008

(65) Prior Publication Data

US 2009/0049014 A1     Feb. 19, 2009

Related U.S. Application Data

(60) Provisional application No. 60/902,777, filed on Feb. 21, 2007.

(51) Int. Cl.
| | | |
|---|---|---|
| G06F 3/00 | (2006.01) | |
| G06F 15/177 | (2006.01) | |
| G06F 17/30 | (2006.01) | |
| H04L 12/58 | (2006.01) | |
| H04L 29/08 | (2006.01) | |

(52) U.S. Cl.
CPC .... *G06F 17/30389* (2013.01); *G06F 17/30424* (2013.01); *G06F 17/30* (2013.01); *G06F 17/30023* (2013.01); *G06F 17/30595* (2013.01); *G06F 17/30979* (2013.01); *G06F 17/30477* (2013.01); *G06F 17/30029* (2013.01); *H04L 51/32* (2013.01); *H04L 67/306* (2013.01); *Y10S 715/969* (2013.01)
USPC ............... 715/733; 715/748; 715/969; 707/3; 707/4; 707/5; 707/769

(58) Field of Classification Search
CPC ................... G06F 17/30991; G06F 17/30554; Y10S 715/968; Y10S 715/99933; G06Q 50/01; H04L 51/32; H04L 67/306
USPC ............................... 715/968; 707/3, 4, 5, 769
See application file for complete search history.

(56) References Cited

U.S. PATENT DOCUMENTS

| | | | |
|---|---|---|---|
| 5,937,413 | A | 8/1999 | Hyun |
| 6,029,141 | A | 2/2000 | Bezos |
| 6,856,995 | B1 * | 2/2005 | Ibitayo et al. .................. 717/116 |
| 7,013,292 | B1 | 3/2006 | Hsu |
| 7,249,123 | B2 | 7/2007 | Elder |
| 7,269,590 | B2 | 9/2007 | Hull |

(Continued)

OTHER PUBLICATIONS

Hemedinger, Slaughter, "Social Networking and SAS: Running PROCs on your Facebook Friends", pp. 1-8, 2011.*

(Continued)

*Primary Examiner* — Ece Hur
(74) *Attorney, Agent, or Firm* — Fenwick & West LLP

(57) ABSTRACT

A structured query language interface provides access to information stored in a social network system. The interface allows third party systems to treat the information stored in the social networking system as a distributed database. The social networking system acts as an expandable distributed database that can add additional fields or categories of data associated with its members. The information provided in response to a structured query may be subject to multiple levels of access control including, business logic rules applicable to users of the social networking system or privacy limitations set by individual users. The social networking system uses a scripting language to extract the information and apply business logic rules to the data.

21 Claims, 4 Drawing Sheets

200

| Table | Columns |
|---|---|
| user | uid*, first_name, last_name, name, pic_small, pic_big, pic, affiliations, profile_update_time, timezone, religion, birthday, sex, hometown_location, meeting_sex, meeting_for, relationship_status, significant_other_id, political, current_location, activities, interests, music, tv, movies, books, quotes, about_me, hs_info, education_history, work_history, notes_count, wall_count, status |
| friend | uid1*, uid2* (these are only indexable if both are specified or for the logged in user's user id) |
| group | gid*, name, nid, pic_small, pic_big, pic, description, group_type, group_subtype, recent_news, creator, update_time, office, website, venue |
| group_member | uid*, gid*, positions |
| event | eid*, name, tagline, nid, pic_small, pic_big, pic, host, description, event_type, event_subtype, start_time, end_time, creator, update_time, location, venue |
| event_member | uid*, eid*, rsvp_status |
| photo | pid*, aid*, owner, src_small, src_big, src, link, caption, created |
| album | aid*, cover_pid*, owner*, name, created, modified, description, location |
| photo_tag | pid*, subject*, xcoord, ycoord |

(56) References Cited

U.S. PATENT DOCUMENTS

| | | | |
|---|---|---|---|
| 7,353,247 B2* | 4/2008 | Hough et al. | 709/202 |
| 7,558,841 B2* | 7/2009 | Taboada et al. | 709/219 |
| 7,616,124 B2* | 11/2009 | Paessel et al. | 340/573.3 |
| 7,680,882 B2* | 3/2010 | Tiu et al. | 709/203 |
| 7,853,881 B1* | 12/2010 | Aly Assal et al. | 715/734 |
| 7,945,653 B2* | 5/2011 | Zuckerberg et al. | 709/223 |
| 8,015,019 B1* | 9/2011 | Smith et al. | 705/1.1 |
| 8,380,716 B2* | 2/2013 | Mirus | 707/737 |
| 8,496,531 B2* | 7/2013 | Youm | 463/42 |
| 8,572,117 B2* | 10/2013 | Rappaport | 707/776 |
| 8,583,480 B2* | 11/2013 | Byrne | 705/14.4 |
| 8,615,432 B2* | 12/2013 | Howard et al. | 705/14.53 |
| 8,706,550 B1* | 4/2014 | Chalawsky et al. | 705/14.41 |
| 8,732,101 B1* | 5/2014 | Wilson et al. | 706/15 |
| 2001/0037721 A1 | 11/2001 | Hasegawa | |
| 2002/0049603 A1* | 4/2002 | Mehra et al. | 705/1 |
| 2002/0059201 A1 | 5/2002 | Work | |
| 2002/0124053 A1* | 9/2002 | Adams et al. | 709/216 |
| 2003/0037064 A1* | 2/2003 | Choban et al. | 707/104.1 |
| 2003/0145093 A1 | 7/2003 | Oren | |
| 2003/0222918 A1 | 12/2003 | Coulthard | |
| 2003/0225632 A1 | 12/2003 | Tong | |
| 2004/0024846 A1 | 2/2004 | Randall | |
| 2004/0088177 A1 | 5/2004 | Travis | |
| 2004/0148275 A1 | 7/2004 | Achlioptas | |
| 2005/0021750 A1 | 1/2005 | Abrams | |
| 2005/0114759 A1 | 5/2005 | Williams | |
| 2005/0154639 A1 | 7/2005 | Zetmeir | |
| 2005/0159970 A1 | 7/2005 | Buyukkokten | |
| 2005/0171799 A1 | 8/2005 | Hull | |
| 2005/0171955 A1 | 8/2005 | Hull | |
| 2005/0177385 A1 | 8/2005 | Hull | |
| 2005/0197846 A1 | 9/2005 | Pezaris | |
| 2005/0198020 A1 | 9/2005 | Garland | |
| 2005/0198031 A1 | 9/2005 | Pezaris | |
| 2005/0198305 A1 | 9/2005 | Pezaris | |
| 2005/0203807 A1 | 9/2005 | Bezos | |
| 2005/0216300 A1* | 9/2005 | Appelman et al. | 705/1 |
| 2005/0216550 A1 | 9/2005 | Paseman | |
| 2005/0235062 A1 | 10/2005 | Lunt | |
| 2005/0256756 A1 | 11/2005 | Lam | |
| 2006/0004590 A1* | 1/2006 | Khoo | 705/1 |
| 2006/0041543 A1 | 2/2006 | Achlioptas | |
| 2006/0042483 A1 | 3/2006 | Work | |
| 2006/0047605 A1* | 3/2006 | Ahmad | 705/64 |
| 2006/0048059 A1 | 3/2006 | Etkin | |
| 2006/0052091 A1 | 3/2006 | Onyon | |
| 2006/0080613 A1 | 4/2006 | Savant | |
| 2006/0085419 A1 | 4/2006 | Rosen | |
| 2006/0136419 A1 | 6/2006 | Brydon | |
| 2006/0143183 A1 | 6/2006 | Goldberg | |
| 2006/0161599 A1 | 7/2006 | Rosen | |
| 2006/0173985 A1* | 8/2006 | Moore | 709/223 |
| 2006/0184617 A1 | 8/2006 | Nicholas | |
| 2006/0190281 A1 | 8/2006 | Kott | |
| 2006/0194186 A1 | 8/2006 | Nanda | |
| 2006/0218225 A1 | 9/2006 | Hee Voon | |
| 2006/0229063 A1 | 10/2006 | Koch | |
| 2006/0230061 A1 | 10/2006 | Sample | |
| 2006/0247940 A1 | 11/2006 | Zhu | |
| 2006/0248573 A1 | 11/2006 | Pannu | |
| 2006/0256008 A1 | 11/2006 | Rosenberg | |
| 2006/0265227 A1 | 11/2006 | Sadamura | |
| 2006/0293976 A1 | 12/2006 | Nam | |
| 2007/0174389 A1 | 7/2007 | Armstrong | |
| 2007/0186007 A1* | 8/2007 | Field et al. | 709/233 |
| 2007/0203996 A1* | 8/2007 | Davitz et al. | 709/206 |
| 2007/0208916 A1 | 9/2007 | Tomita | |
| 2007/0282987 A1 | 12/2007 | Fischer | |
| 2008/0005076 A1 | 1/2008 | Payne | |
| 2008/0010343 A1 | 1/2008 | Escaffi | |
| 2008/0033776 A1 | 2/2008 | Marchese | |
| 2008/0040428 A1 | 2/2008 | Wei | |
| 2008/0046976 A1* | 2/2008 | Zuckerberg | 726/4 |
| 2008/0052371 A1* | 2/2008 | Partovi et al. | 709/217 |
| 2008/0070697 A1 | 3/2008 | Robinson | |
| 2008/0086458 A1* | 4/2008 | Robinson et al. | 707/3 |
| 2008/0091723 A1* | 4/2008 | Zuckerberg et al. | 707/104.1 |
| 2008/0098313 A1* | 4/2008 | Pollack | 715/753 |
| 2008/0104679 A1* | 5/2008 | Craig | 726/4 |
| 2008/0120411 A1* | 5/2008 | Eberle | 709/225 |
| 2008/0214148 A1* | 9/2008 | Ramer et al. | 455/414.1 |
| 2008/0270038 A1* | 10/2008 | Partovi et al. | 702/19 |
| 2008/0274687 A1* | 11/2008 | Roberts et al. | 455/3.06 |
| 2008/0313714 A1* | 12/2008 | Fetterman et al. | 726/4 |
| 2009/0030919 A1* | 1/2009 | Brezina et al. | 707/100 |
| 2009/0030940 A1* | 1/2009 | Brezina et al. | 707/103 Y |
| 2009/0055435 A1* | 2/2009 | Kiviluoto et al. | 707/104.1 |
| 2009/0070334 A1* | 3/2009 | Callahan et al. | 707/9 |
| 2009/0164408 A1* | 6/2009 | Grigorik et al. | 707/1 |
| 2009/0177484 A1* | 7/2009 | Davis et al. | 705/1 |
| 2009/0187537 A1* | 7/2009 | Yachin et al. | 707/3 |
| 2009/0204581 A1* | 8/2009 | Lim | 707/3 |
| 2009/0282342 A1* | 11/2009 | Fabris et al. | 715/733 |
| 2010/0023434 A1* | 1/2010 | Bond | 705/35 |
| 2010/0174709 A1* | 7/2010 | Hansen et al. | 707/728 |
| 2010/0257028 A1* | 10/2010 | Hillerbrand | 705/10 |
| 2010/0274815 A1* | 10/2010 | Vanasco | 707/798 |
| 2010/0280879 A1* | 11/2010 | O'Sullivan et al. | 705/10 |
| 2010/0280913 A1* | 11/2010 | O'Sullivan et al. | 705/26 |
| 2010/0306185 A1* | 12/2010 | Smith et al. | 707/709 |
| 2010/0306834 A1* | 12/2010 | Grandison et al. | 726/7 |
| 2011/0038470 A1* | 2/2011 | Kent | 379/142.04 |
| 2011/0130168 A1* | 6/2011 | Vendrow et al. | 455/556.1 |
| 2011/0191417 A1* | 8/2011 | Rathod | 709/204 |
| 2011/0191717 A1* | 8/2011 | Cort et al. | 715/816 |
| 2012/0072416 A1* | 3/2012 | Gowel | 707/723 |
| 2012/0174155 A1* | 7/2012 | Mowrey et al. | 725/40 |
| 2013/0124542 A1* | 5/2013 | Lee et al. | 707/751 |
| 2013/0144899 A1* | 6/2013 | Lee et al. | 707/759 |

OTHER PUBLICATIONS

Flores, Fernando et al. "Computer systems and the design of organizational interaction." In ACM Transactions on Information Systems (TOIS), vol. 6, Issue 2, Apr. 1988.

PCT International Search Report and Written Opinion, PCT US2008/02354, Aug. 1, 2008.

Phanouriou, C., "UIML: A Device-Independent User Interface Markup Language," PhD dissertation submitted to Computer Science and Applications Dept., Virginia Polytechnic Institute and State University. Published on Sep. 26, 2000, [Online] [Retrieved on Jun. 15, 2008]. Retrieved from the Internet: <URL: http://xml.coverpages.org/PhanouriouETD.pdf>.

Chipin, "How Chipln Works: An Overview," Dec. 15, 2006. [Online] [Retrieved Jun. 20, 2008] Retrieved from the Internet <URL:http://web.archive.org/web/20061215090739/www.chipin.com/overview.>.

Parzek, E. "Social Networking to Chipln to a Good Cause," Business Design Studio, Jun. 29, 2006. [Online] [Retrieved Jun. 20, 2008] Retrieved from the Internet <URL:http://www.businessdesignstudio.com/resources/blogger/2006/06/social-networking-to-chipin-to-good.html.>.

* cited by examiner

| Table | Columns |
|---|---|
| user | uid*, first_name, last_name, name, pic_small, pic_big, pic, affiliations, profile_update_time, timezone, religion, birthday, sex, hometown_location, meeting_sex, meeting_for, relationship_status, significant_other_id, political, current_location, activities, interests, music, tv, movies, books, quotes, about_me, hs_info, education_history, work_history, notes_count, wall_count, status |
| friend | uid1*, uid2* (these are only indexable if both are specified or for the logged in user's user id) |
| group | gid*, name, nid, pic_small, pic_big, pic, description, group_type, group_subtype, recent_news, creator, update_time, office, website, venue |
| group_member | uid*, gid*, positions |
| event | eid*, name, tagline, nid, pic_small, pic_big, pic, host, description, event_type, event_subtype, start_time, end_time, creator, update_time, location, venue |
| event_member | uid*, eid*, rsvp_status |
| photo | pid*, aid*, owner, src_small, src_big, src, link, caption, created |
| album | aid*, cover_pid*, owner*, name, created, modified, description, location |
| photo_tag | pid*, subject*, xcoord, ycoord |

FIG. 2

SYSTEMS AND METHODS FOR IMPLEMENTATION OF A STRUCTURED QUERY LANGUAGE INTERFACE IN A DISTRIBUTED DATABASE ENVIRONMENT

CROSS-REFERENCE TO RELATED APPLICATIONS

The present application claims the benefit and priority of U.S. Provisional Patent Application Ser. No. 60/902,777 filed on Feb. 21, 2007, titled "Systems and Methods for Implementation of a Structured Query Language Interface in a Distributed Database Environment," which is hereby incorporated by reference.

BACKGROUND OF THE INVENTION

1. Field of the Invention

The present invention relates generally to web applications that provide an Application Program Interface ("API") for external, untrusted developers and more particularly to systems and methods for implementation of a structured query language interface in a distributed database environment.

2. Description of Related Art

Conventionally, Structured Query Language ("SQL") is designed for querying data contained in a single relational database. Though widely understood and adopted, SQL is not designed for querying data contained in a distributed database, nor is it designed for providing access to this data to external developers. Instead, alternative Application Program Interfaces are used by external developers to access this data.

Alternative Application Program Interfaces suffer from several drawbacks. First, most alternative Application Program Interfaces are incapable of performing focused queries. Thus, bandwidth and computing resources are wasted in providing query responses that may contain large amounts of irrelevant data. Second, third-party developers employing alternative Application Program Interfaces typically need to reconfigure their respective programs for each new query routine. Accordingly, when a distributed database is expanded with one or more additional categories of data, third-party developers generally need to spend time reconfiguring their respective programs. Third, business logic rules imposed by an administrator and/or a user of a distributed database typically must be applied to data to be queried via an alternative Applied Program Interface before third-party developers may access the data. Thus, there is a need for systems and methods for implementation of a structured query language interface in a distributed database environment.

SUMMARY OF THE INVENTION

Systems and methods for implementation of a structured query language interface in a distributed database environment are provided. Exemplary systems include a distributed database configured with items of data, a volatile cache memory configured with a subset of the items of data, a scripting language configured to extract data from the volatile cache memory, and a structured query language interface configured to receive a query over a network, to send the query to the scripting language, and to receive extracted data from the scripting language in response to the query. Further systems include the scripting language configured to apply business logic rules to the extracted data before the extracted data is sent to the structured query language interface. The structured query language interface may also be further configured to send some or all of the extracted data in a format to accommodate a database maintained by a third-party developer.

Exemplary methods include configuring a distributed database with items of data, configuring a volatile cache memory with a subset of the items of data, configuring a scripting language to extract data from the volatile cache memory, and configuring the structured query language interface in communication with the scripting language to receive a query over a network, to send the query to the scripting language, and to receive extracted data from the scripting language in response to the query. Further methods include configuring the scripting language to apply business logic rules to extracted data before the extracted data is sent to the structured query language interface.

BRIEF DESCRIPTION OF THE DRAWINGS

FIG. 2 shows an exemplary reference table for conducting SQL queries via a third-party developer SQL interface;

DETAILED DESCRIPTION OF THE INVENTION

According to various exemplary systems and methods, an SQL interface is used by one or more third-party developers to query an expandable distributed database. Query responses may be subject to business logic rules imposed by an administrator and/or user of the distributed database. As additional categories of information are added to the distributed database, third-party developers may source the information found in the additional categories, without having to reconfigure their respective systems. Because query constraints may include such commands as the WHERE clause and only list certain fields in the SELECT clause, query responses match a specific condition, rather than providing all of the information available about a large set of items.

Figure 1:
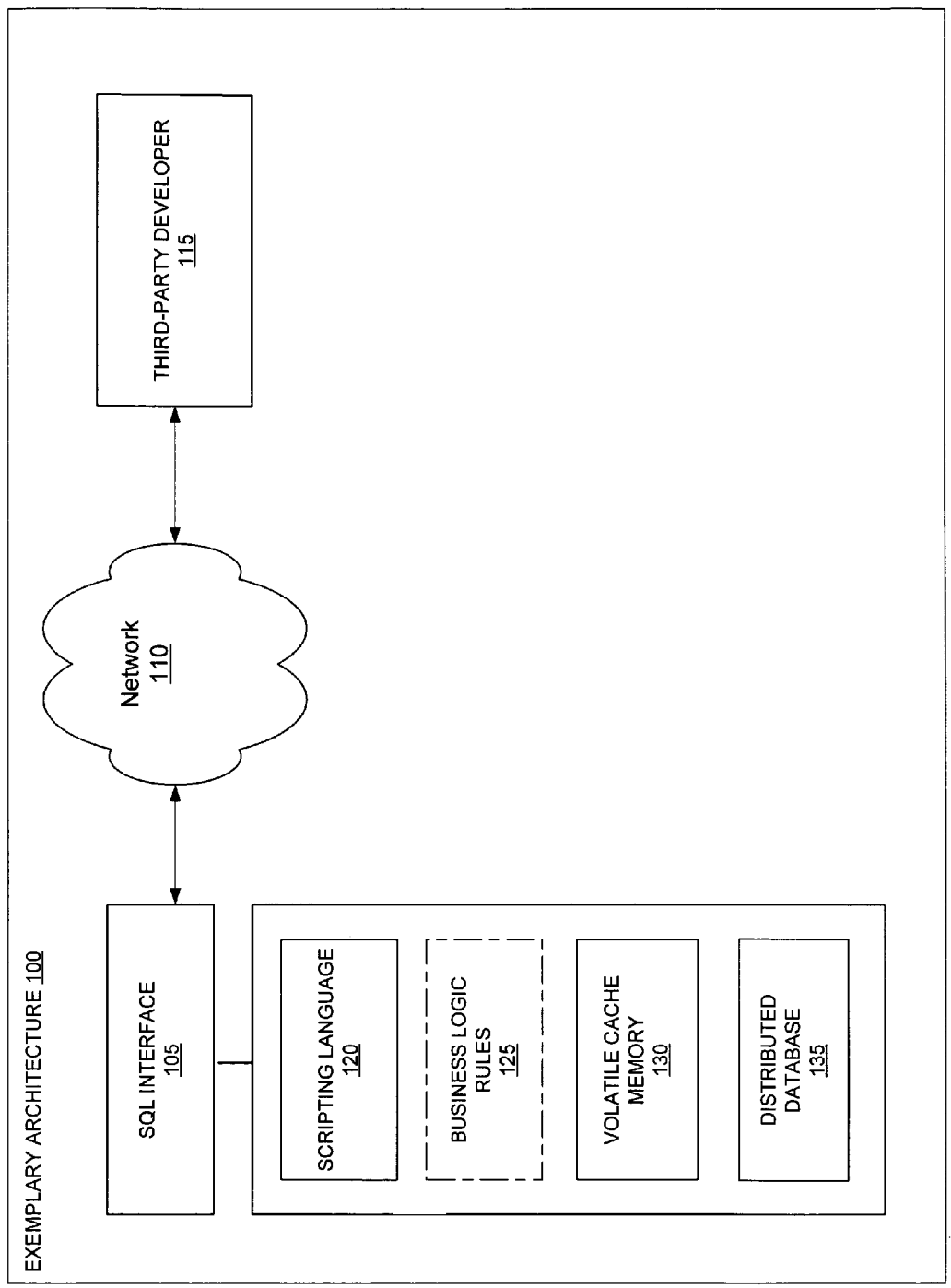
FIG. 1 illustrates an exemplary architecture according to one system and method for implementation of a structured query language interface in a distributed database environment.

FIG. 1 illustrates an exemplary architecture according to one system and method for implementation of a structured query language interface in a distributed database environment. The exemplary architecture 100 may include an SQL interface 105, a network 110, a third-party developer 115, a scripting language 120, optional business logic rules 125, a volatile cache memory 130, and a distributed database 135. The network 110 may represent any network where the transmission of digital content occurs, including the Internet. The third-party developer 115 may be a software developer or any other party with a networked application or web site that may also be a separate entity from the entity responsible for the underlying or primary software being used, such as a web-based social network. For example, the third-party developer 115 may provide an external software tool that helps organize or use the information within the social network.

According to various exemplary systems, the distributed database 135 may represent a distributed database for a web-based social network. The distributed database 135 may be comprised of multiple databases and the number of databases may increase or decrease over time.

The volatile cache memory 130, in one exemplary system and method, may pool most or all of the data found in the distributed database 135. In general, the volatile cache memory 130 facilitates rapid query response times, when compared to the time required for querying all or most all of the databases forming the distributed database 135. Further, the data found in the volatile cache memory 130 may represent the data set from which a particular query response may be sourced. The data found in the distributed database 135 may represent the data sourced in a query response if the volatile cache memory 130 appears to lack certain pieces of data that may be the subject of a particular query and found in the distributed database 135.

In one further exemplary system and method, the optional business logic rules 125 may represent limitations selected by the users or members of a web-based social network. For example, a member of the social network may limit the other members of the social network that may access the member's personal information, such as the member's address and telephone number. The business logic rules 125 may also represent limitations selected by an administrator of the social network.

The scripting language 120, according to various exemplary systems, may be any programming environment typically used to create dynamic web pages, including, however not limited to, PHP Hypertext Preprocessor. With syntax from C, Java and Perl, PHP code may be embedded within HTML pages for server side execution. PHP may be used to extract data from a database in order to present it on a web page. PHP may extract data out of the volatile cache memory 130. Optionally, PHP may apply the business logic rules 125 against extracted data. It is this data (with or without application of the business logic rules 125) that is generally provided to the third-party developer 115 in the form of an SQL query response.

In one exemplary system, the SQL interface 105 may utilize SQL-style syntax for queries. For example, the third-party developer 115, such as an online book retailer, may wish to learn the identities of the members of a web-based social network who have an interest in baseball. Accordingly, the third-party developer 115 may utilize the SQL interface 105 to perform such a query. Optionally, a response provided to the third-party developer 115 utilizing the SQL interface 105 may be limited by the business logic rules 125, such as privacy limitations. For example, the third-party developer 115 may receive the name, however, not the email address of a particular social network member who is interested in baseball.

According to further exemplary systems and methods, query responses provided to a third-party developer, such as the third-party developer 115, are automatically formatted to accommodate the database of the third-party developer. For example, numerous third-party developers may each have a database, with each database having various subsets of the data found in an expandable distributed database, such as the distributed database 135. An expandable distributed database may be represented by a social network that adds additional fields or categories of data associated with its members. For instance, a social network may add a field to its distributed database for the brand of car owned by each of its members. Accordingly, some third-party developers may wish to modify their respective databases to include this new information, subject to any business logic rules (e.g. business logic rules 125) imposed by the social network and/or its members. The responses provided to the third-party developers are automatically formatted to accommodate the respective databases of the third-party developers.

FIG. 2 shows an exemplary reference table for conducting SQL queries via a third-party developer SQL interface. The exemplary reference table 200 includes a left column having the heading of "Table" that corresponds to strings that may be used in the FROM clause, while the right column having the heading of "Columns" corresponds to columns that may be referenced in the SELECT and WHERE clauses.

Based on one exemplary system and method, queries may be indexable. In order to make a query indexable, the WHERE may contain an "=" or "IN" clause for one of the columns marked with a "*". A third-party developer may not, for example, just specify WHERE 1 as the entire WHERE clause, since in many cases this may result in far too large of a result set (the photos table as described herein, for example, may contain over 1 billion entries). In general, queries should be limited to working on a specific, enumerable set of items, by referencing one of the indexable columns (i.e. the columns marked with a "*" in reference table 200) in the WHERE clause. More specifically, if the WHERE clause were to be written in Disjunctive Normal Form, each conjunction should contain at least one "=" or "IN" expression that uses an indexable column.

Queries, according to various exemplary methods, may be in the form SELECT [fields] FROM [table] WHERE [conditions]. The FROM clause in the third-party developer SQL interface may contain only a single table. Additionally, in the SELECT or WHERE clauses, the IN keyword may be used to perform subqueries, but the subqueries may not reference variables in the outer query's scope.

For example, using the exemplary reference table 200 shown in FIG. 2, a third-party developer, such as the third-party developer 115 (FIG. 1), may wish to obtain the names and networks for the friends of a particular social network member who works at a company called "Facebook." Accordingly, the third-party developer may utilize the third-party developer SQL interface to query:

SELECT name, affiliations FROM user
WHERE uid IN (SELECT uid2 FROM friend WHERE uid1=211031) AND "Facebook" IN affiliations.name.

In response, the third-party developer may be provided with the following information:

```
<?xml version="1.0" encoding="UTF-8"?>
<fql_query_response xmlns="http://api.facebook.com/1.0/"
  xmlns:xsi="http://www.w3.org/2001/XMLSchema-instance"
  xsi:schemaLocation="http://api.facebook.com/1.0/
  http://api.facebook.com/1.0/facebook.xsd" list="true">
    <user>
    <name>Mark Zuckerberg</name>
    <affiliations list="true">
    <affiliation>
    <nid>50431648</nid>
    <name>Facebook</name>
    <type>work</type>
    <status/>
    <year/>
    </affiliation>
    <affiliation>
    <nid>16777217</nid>
    <name>Harvard</name>
    <type>college</type>
    <status>Undergrad</status>
    <year/>
    </affiliation>
    etc...
```

As another example, using the exemplary reference table 200, a third-party developer may wish to obtain the photo image sources and captions for photos in which two given users or members of the social network are both tagged, and only for those photos in the set that have captions. Accordingly, the third-party developer may utilize the third-party developer SQL interface to query:

SELECT src, caption FROM photo
        WHERE pid IN (SELECT pid FROM photo_tag WHERE subject=211031) AND
        pid IN (SELECT pid FROM photo_tag WHERE subject=204686) AND caption.

In response, the third-party developer may be provided with the following information:

```
<?xml version="1.0" encoding="UTF-8"?>
<fql_query_response xmlns="http://api.facebook.com/1.0/"
xmlns:xsi="http://www.w3.org/2001/XMLSchema-instance"
xsi:schemaLocation="http://api.facebook.com/1.0/
http://api.facebook.com/1.0/facebook.xsd" list="true">
    <photo>
        <src>http://photos-
923.ak.facebook.com/ip002/v61/188/75/206412/
s206412_31508923_7923.jpg</src>
        <caption>celebrating 23 years of ari's life at the one and the
oasis.</caption>
    </photo>
    <photo>
        <src>http://photos-
447.ak.facebook.com/ip005/v40/164/17/202965/
s202965_30849447_4635.jpg</src>
        <caption>Liar's Dice...</caption>
    </photo>
    <photo>
        <src>http://photos-
480.ak.facebook.com/ip005/v29/188/75/206412/
s206412_30452480_140.jpg</src>
        <caption>the crew. (RishDAWG!)</caption>
    </photo>
    <photo>
        <src>http://photos-
103.ak.facebook.com/ip001/v12/188/75/206412/
s206412_30325103_6676.jpg</src>
        <caption>group photo!!!!</caption>
    </photo>
    <photo>
        <src>http://photos-
399.ak.facebook.com/ip001/v10/188/75/206412/
s206412_30191399_9134.jpg</src>
        <caption>someone is particularly happy to be in this
picture</caption>
    </photo>
    <photo>
        <src>http://photos-
716.ak.facebook.com/ip007/v16/129/99/204686/
s204686_30190716_7256.jpg</src>
        <caption>One of the most extravagant.</caption>
    </photo>
</fql_query_response>
```

Figure 3:
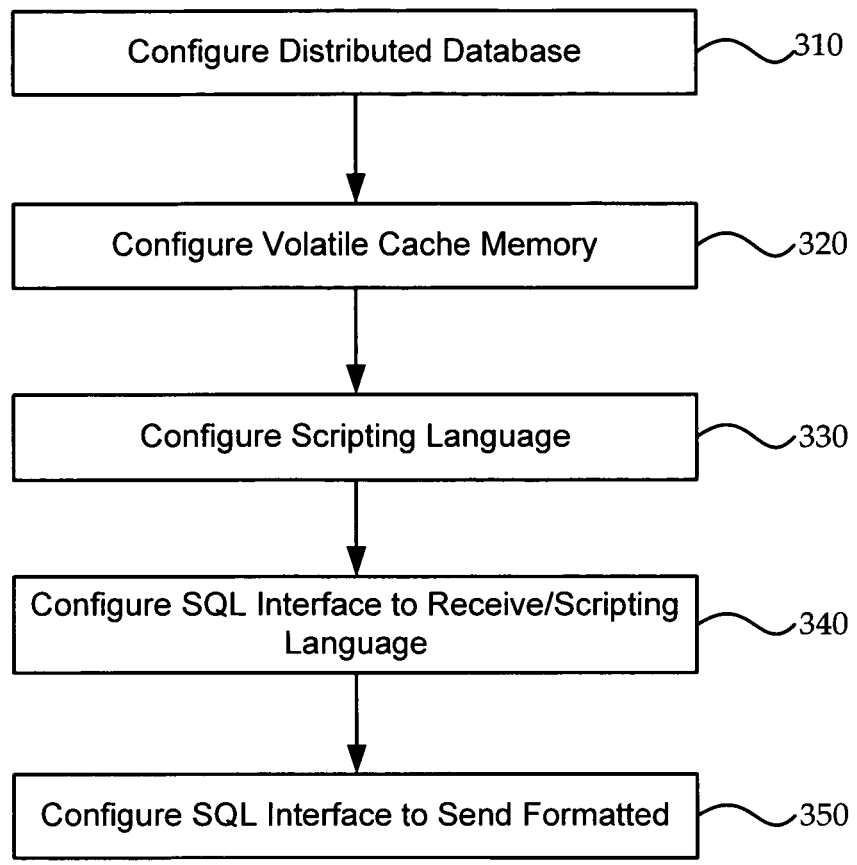
FIG. 3 is a flow chart of an exemplary method for implementation of a structured query language interface in a distributed database environment.

FIG. 3 is a flow chart of an exemplary method for implementation of a structured query language interface in a distributed database environment.

At step 310, a distributed database is configured with items of data. According to one exemplary method, the distributed database is associated with a web-based social network.

At step 320, a volatile cache memory is configured with a subset of the items of data in the distributed database.

At step 330, a scripting language is configured to extract data from the volatile cache memory.

At step 340, a structured query language interface is configured to receive a query over a network, to send the query to the scripting language, and to receive extracted data from the scripting language in response to the query.

At step 350, the structured query language interface is configured to send some or all of the extracted data to a third-party developer in a format to accommodate a database maintained by the third-party developer.

Figure 4:
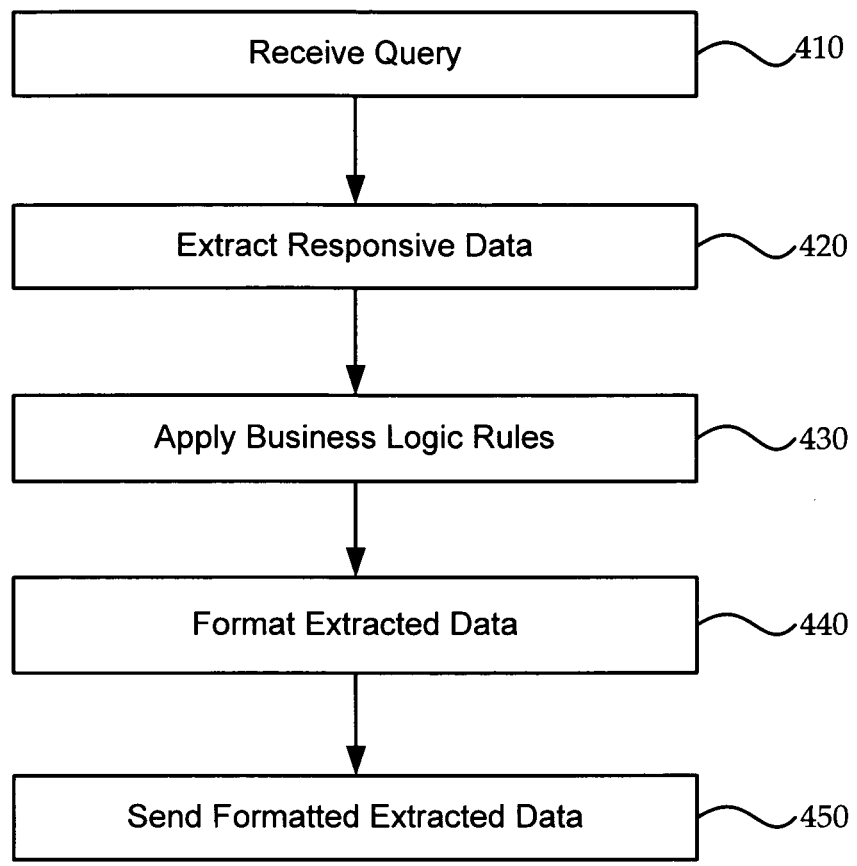
FIG. 4 is a flow chart of an exemplary method for performing a query of a distributed database.

FIG. 4 is a flow chart of an exemplary method for performing a query of a distributed database.

At step 410, a query is received over a network from an application or web site maintained by a third-party developer.

At step 420, data responsive to the query is extracted by a structured query language.

At step 430, business logic rules are applied to the extracted data.

At step 440, the extracted data is formatted to accommodate a database maintained by the third-party developer.

At step 450, the formatted extracted data is sent over the network to the third-party developer.

While various systems and methods have been described above, it should be understood that they have been presented by way of example only, and not limitation.

What is claimed is:

1. A system comprising:
one or more processors;
a distributed database configured with items of data, the distributed database storing information of a social networking system describing a plurality of existing users;
a scripting language configured to extract data from the social networking system, the data extraction applying access control comprising privacy settings of each user of the social networking system, the privacy settings restricting the information about the user that is accessible to other users of the social networking system; and
a structured query language interface for extracting information of the social networking system, the structured query language interface in communication with the scripting language, the structured query language interface configured to access database systems and further configured to receive a query over a network, to send the query to the scripting language, and to receive extracted data from the scripting language comprising the requested information subject to the privacy settings of users of the social networking system in response to the query,
wherein the distributed database allows an addition by the social networking system of a new field or category of data to the plurality of existing users, the new field or category of data representing an attribute describing each user of the plurality of existing users and storing data directly received from one or more users of the social networking system rather than data derived from one or more existing fields of data; and
wherein the structured query language is further configured to receive a request from an application or website maintained by a third party separate from the social networking system, the request identifying the new field or category of data, generate a response to the request comprising the new field or category of data, determine a format for the response to accommodate a database of the third party, convert the response into the determined format, and provide the response in the determined format to the third party.

2. The system of claim 1, wherein the scripting language is further configured to apply business logic rules to the extracted data before the extracted data is sent to the structured query language interface.

3. The system of claim 1, wherein the structured query language interface is further configured to send some or all of the extracted data over the network.

4. The system of claim 1, wherein the structured query language interface is further configured to send some or all of the extracted data over the network to the application or a web site maintained by a third-party developer.

5. The system of claim 1, wherein the query is received by the structured query language interface from the application or a web site maintained by a third-party developer.

6. The system of claim 1, wherein the scripting language is further configured to extract data from the distributed database.

7. The system of claim 1, wherein the distributed database comprises a plurality of databases.

8. The system of claim 5, wherein the third-party developer is a commercial entity.

9. The system of claim 5, wherein the third-party developer is a non-commercial entity.

10. The system of claim 5, wherein the application is accessible from a web-based social network.

11. The system of claim 5, wherein the application is accessible from a web-based social network when a user of the web-based social network is operating within an environment of the social network.

12. The system of claim 11, wherein the environment comprises at least in part a personal profile page.

13. The system of claim 1, wherein the distributed database is associated with a web-based social network.

14. The system of claim 1, wherein the structured query language interface is further configured to send some or all of the extracted data in a format to accommodate a database maintained by a third-party developer.

15. A method comprising:
configuring a distributed database with items of data, the distributed database storing information of a social networking system describing a plurality of existing users;
configuring a scripting language to extract data from the social networking system, the data extraction applying access control comprising privacy settings of each user of the social networking system, the privacy settings restricting the information about the user that is accessible to other users of the social networking system; and
configuring a structured query language interface configured to access database systems to receive a query requesting information from the social networking system over a network, to send the query to the scripting language, and to receive extracted data from the scripting language comprising the requested information subject to the privacy settings of users of the social networking system in response to the query
adding, by the social networking system, to the distributed database a new field or category of data to the plurality of existing users, the new field or category of data representing an attribute describing each user of the plurality of existing users and storing data directly received from one or more users of the social networking system rather than data derived from one or more existing fields of data;
receiving a request from an application or website maintained by a third party separate from the social networking system, the request identifying the new field or category of data;
generating a response to the request, the response comprising the new field or category of data;
determining a format for the response to accommodate a database of the third party;
converting the response comprising the new field or category of data into the determined format; and
providing the response in the determined format to the third party.

16. The method of claim 15, the method further comprising:
configuring the scripting language to apply business logic rules to extracted data before the extracted data is sent to the structured query language interface.

17. The method of claim 15, the method further comprising:
configuring the structured query language interface to send some or all of the extracted data over the network.

18. The method of claim 15, the method further comprising:
configuring the structured query language interface to send some or all of the extracted data over the network to the application or a web site maintained by a third-party developer.

19. The method of claim 15, the method further comprising:
configuring the structured query language interface to send some or all of the extracted data in a format to accommodate a database maintained by a third-party developer.

20. A method comprising:
maintaining a database system configured with items of data, the database system storing information of a social networking system describing a plurality of existing users;
receiving a query over a network from an application or web site maintained by a third-party developer, the query conforming to a structured query language interface for accessing information of database systems;
extracting data responsive to the query, the data comprising information of a social networking system;
applying business logic rules to the extracted data, the business logic rules applying access control comprising privacy settings of each user of the social networking system, the privacy settings restricting the information about the user that is accessible to other users of the social networking system;
determining a format for the response to accommodate a database of the third party;
converting the response into the determined format;
providing the response in the determined format to the third party;
adding, by the social networking system, to the database system a new field or category of data to the plurality of existing users, the new field or category of data representing an attribute describing each user of the plurality of existing users and storing data received from users of the social networking system rather than data derived from existing fields of data;
receiving a subsequent request from the application or website maintained by the third party developer, the application or website separate from the social networking system, the subsequent request identifying the new field or category of data;
generating a response to the subsequent request, the response comprising the identified new field or category of data;
determining a format for the response to accommodate a database of the third party;
converting the response comprising the new field or category of data into the determined format; and
providing the response in the determined format to the third party.

21. A method comprising:
receiving a request from a third party system for information from a social networking system separate from the third party system, the information describing a plurality of existing users of the social networking system, the request conforming to a structured query language interface for accessing information of database systems;

extracting data from the social networking system, the data extraction applying access control comprising privacy limitations of each user of the social networking system, the privacy limitations restricting the information describing the user that is accessible to other users of the social networking system; and formatting the extracted data in response to the request from the third party system, the response conforming to the structured query language interface for accessing information of database systems;

sending the response to the third party system;

modifying, by the social networking system, the representation of information of the social networking system, the modification comprising addition of a new field or category of data received from one or more users of the social networking system rather than data derived from one or more existing fields of data, the new field or category of data describing the one or more users of the social networking system;

receiving a subsequent request from the third party system conforming to the modified representation of information of the social networking system, the subsequent request identifying the new field or category of data representing an attribute describing each user of the plurality of existing users;

determining a format to accommodate a database maintained by the third party system, the database separate from the social networking system; and configuring the structured query language interface to send some or all of the extracted data in the determined format to accommodate the database maintained by the third party system; and providing a response to the third party system formatted to conform to the subsequent request.

* * * * *